(12) United States Patent
Chang

(10) Patent No.: US 7,369,274 B2
(45) Date of Patent: May 6, 2008

(54) COLOR ERROR DIFFUSION METHOD

(75) Inventor: Ching-Wei Chang, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 613 days.

(21) Appl. No.: 10/935,763

(22) Filed: Sep. 8, 2004

(65) Prior Publication Data

US 2006/0061781 A1    Mar. 23, 2006

(51) Int. Cl.
   *G06K 1/00*    (2006.01)
(52) U.S. Cl. .................. 358/1.9; 358/523; 358/524
(58) Field of Classification Search ........... 358/1.9, 358/504, 518, 523, 524; 382/162, 167; 345/601, 345/602
   See application file for complete search history.

(56) References Cited

U.S. PATENT DOCUMENTS

| | | | |
|---|---|---|---|
| 5,070,413 A | 12/1991 | Sullivan et al. | |
| 5,497,180 A * | 3/1996 | Kawakami et al. | 347/131 |
| 5,621,545 A | 4/1997 | Motta et al. | |
| 5,621,546 A | 4/1997 | Klassen et al. | |
| 6,072,591 A | 6/2000 | Harrington | |
| 6,178,008 B1 | 1/2001 | Bockman et al. | |
| 6,271,936 B1 | 8/2001 | Yu et al. | |
| 6,483,606 B1 | 11/2002 | Klassen et al. | |
| 6,535,635 B1 | 3/2003 | Klassen et al. | |
| 2007/0019217 A1 * | 1/2007 | Chang | 358/1.9 |

FOREIGN PATENT DOCUMENTS

JP    9-307776    11/1997

* cited by examiner

*Primary Examiner*—Kimberly A. Williams
(74) *Attorney, Agent, or Firm*—Stolowitz Ford Cowger LLP

(57) ABSTRACT

A color error diffusion method effective between a color image input device operating in one color space and a color image output device operating in another color space. The method includes the steps of (a) preparing a final color palette for use in a practice of vector error diffusion intermediate the color image input and output devices, and (b) basing that preparing upon a reverse color conversion step which is effectively applied to a generated calibrated color profile associated with operation of the color image input device.

10 Claims, 1 Drawing Sheet

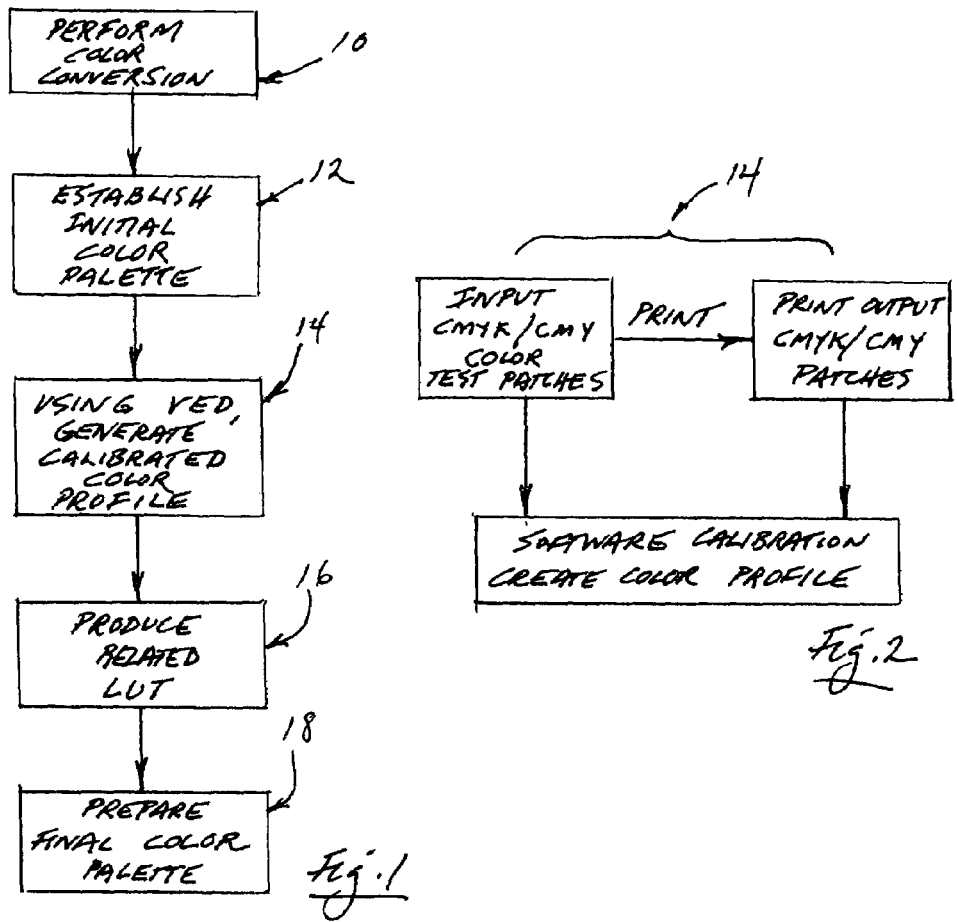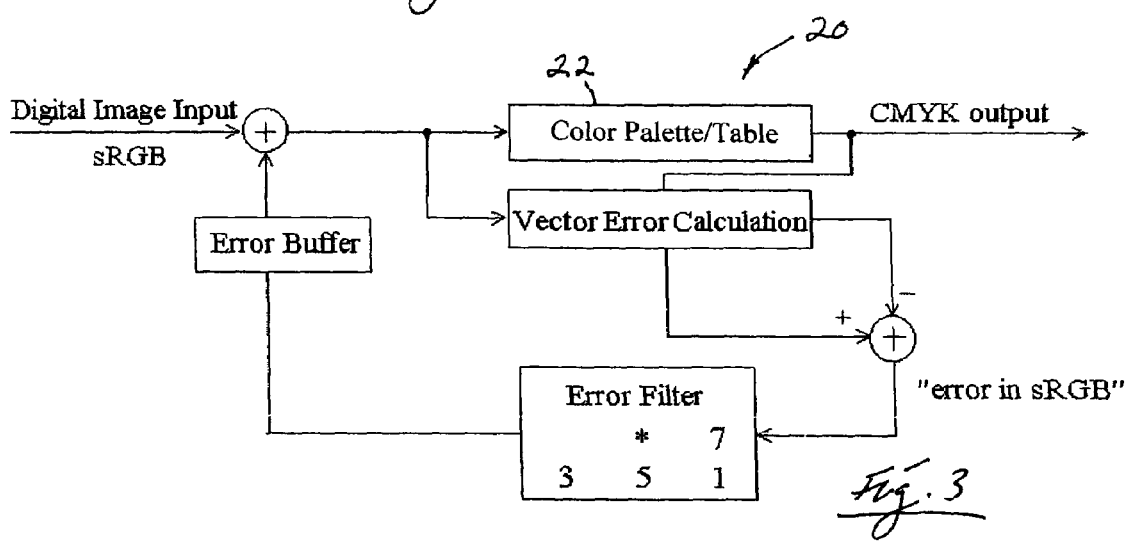

COLOR ERROR DIFFUSION METHOD

BACKGROUND AND SUMMARY OF THE INVENTION

This invention pertains to color error diffusion, and in particular, relates to the creation, for error-diffusion use, of a unique color palette which directly relates the operating color space of a color image input device with each of the possible output colors of a color image output device which performs in, or has, another operating color space. Most especially, the present invention focuses attention of the handling of digital color image data in color spaces which do not involve luminance channels, and with respect to which a quite accurate and very pleasing "flow" of output color imaging quite accurately reflects the appearance of color imaging directly associated with the input color image device.

For the purpose of explanation and illustration herein, and not with any intention to limit what will be seen to be the broad scope of this invention, a preferred manner of practicing the invention is described especially in the context of a color image input device (input device) which is a color display device that operates in sRGB color space, and a color output device (output device) which is a printer that operates in CMYK color space. Other input color spaces very suitable for employment with respect to practice of the present invention include RGB color space and cRGB color space. Similarly, another output color space which is easily accommodated is CMY color space.

According to important characteristics of the present invention, a final created operational color palette, useable for error diffusion, is effectively created in what is referred to herein as a reverse color conversion procedure which flows from the prior creation of an appropriate calibrated color profile that is directly associated with the nature and operation of the color image input device.

According to one preferred manner of expressing the nature of the present invention, what is proposed is a color error diffusion method that is effective between a color image input device which operated in one color space and a color image output device which operates in another color space, with the steps of the method including (a) preparing a final color palette for use in a practice of vector error diffusion intermediate the color image input device and the color image output device, and (b) basing that preparation upon a reverse color conversion step which is effectively applied to a generated calibrated color profile directly associated with the operation of the color image input device. That methodology is performed in a setting wherein the color image input device's color space is one selected from the group including sRGB color space, RGB color space and cRGB color space, and the color image output device's color space is one selected from the group including CMYK color space and CMY color space.

Another way for expressing the invention is that it takes the form of a color error diffusion method which is effective between a color image input device that operates in one color space and a color image output device that operates in another color space, with, from this point of view, the steps of the method including (a) with respect to the color image input device, performing a first color conversion from that device's operating color space to a selected, transitional color space which is a generic version of the color image output device's operating color space, (b) creating an initial color palette from this first color conversion, (c) using the created initial color palette in a vector error diffusion process, preparing test color calibration images, and from these images generating a calibrated color profile which is associated with the operation of the color image input device, (d) from the generated calibrated color profile, producing a color look-up table which relates the color image input device's operating color space to the color image output device's operating color space, and (e) from the produced look-up table, and employing, effectively, the performance of a second, reverse color conversion step, preparing a final color palette which relates the color image input device's operating color space to each of the possible output colors that are producible by the color image output device in its operating color space.

The various features and advantages of the invention will now become more fully apparent as the description which follows is read in conjunction with the accompanying drawings.

DESCRIPTION OF THE DRAWINGS

FIG. 1 is a high-level block/schematic diagram which illustrates the methodologic architecture of the methodology of a preferred and best mode manner of practicing the present invention.

FIG. 2 is a block/schematic diagram illustrating, in a slightly more detailed fashion, the operational architecture of one of the blocks pictured in FIG. 1.

FIG. 3 is a block/schematic diagram illustrating an error diffusion practice for handling color image data in accordance with the use of a final color palette which has been prepared in accordance with the methodology of the present invention.

DETAILED DESCRIPTION OF THE DRAWINGS

From the preliminary discussion given above regarding the nature of the present invention and of it's steps of practice, when this discussion is considered in conjunction with the three drawing figures presented herein, I believe that this expository material fully, and substantially without any requirement for further detailed embellishment, clearly describes to one skilled in the art how to implement and practice the methodology of the present invention.

With reference first of all to FIG. 1, the architecture of the methodology of this invention is displayed in this figure in five operatively interconnected blocks 10, 12, 14, 16, 18. As was mentioned earlier herein, a preferred manner of practicing the invention will be described in the context of practicing this invention in the operational region which lies intermediate what is referred to herein as a color image input device and a color image output device. Many different specific kinds of color image input and color image output devices can be associated with the practice of the present invention. Chosen specifically for illustration herein as a color image input device is a color display device which functions in sRGB operating color space, and selected for illustration as a color image output device is a color printer which operates in CMYK color space. These two color spaces, as is well known to those skilled in the art, define colors in their respective spaces without reference to a luminance channel, and such color spaces have been determined to be excellent ones in which to implement the practice of this invention. Other clearly employable input color spaces include RGB color space and cRGB color space. Another very appropriate output color space is CMY color space.

Practice of the present invention has demonstrated its ability to render output color images in printed output imagery colors which are strikingly similar to the pleasing colors that one most usually experiences in viewing a displayed color image in a display device which operates in sRGB color space. As will become apparent to those skilled in the art, this faithfulness of color rendering, which truly implements the expression "what you see is what you get", flows directly from the innovative practice of the present invention, wherein, from a calibrated color profile that is prepared in relation to the operation of the input display device, a final color palette, which is used to manage color error diffusion for the feeding of data to the printer output device, is prepared following a procedure referred to herein as a reverse color conversion. This procedure results, significantly, in such a final color palette that offers a strikingly pleasing relationship between the operating color space of the input display device and the operating color space of the color image output device (printer).

Block 10 in FIG. 1 represents an early stage in the practice of the invention wherein, through the use of any suitable conventional color conversion tool and practice, the sRGB colors associated with the display input device are correlated and associated with what is referred to herein as a generic CMYK color space—a color space which, thus, is said to have a generic relationship with the CMYK operating color space of the output printer. From this conversion, and in accordance with the operation of Block 12 in FIG. 1, an initial color palette is established which cross-relates these two color spaces.

Utilizing this initial color palette, as referring to the operation of Block 14 in FIG. 1, CMYK color test images are fed to the printer, with output color readings taken, all for the purpose of performing the creation of what is referred to herein as a calibrated color profile which is associated directly with the operation of the input display device. FIG. 2 in the drawings illustrates this Block 14 practice, and it is important to understand that this printing for calibration purposes utilizes, for vector error diffusion (VED), the earlier prepared initial color palette, with vector error diffusion, in accordance with that palette, taking place in sRGB color space.

From this generated and calibrated color profile, a look-up table (LUT), and preferably one which is a 3-D look-up table, is created (Block 16) which establishes a relationship between the sRGB operating color space of the input display device and the CMYK color space of the output printer. Then, utilizing the thus-produced look-up table which is directly related to the mentioned calibrated color profile, there follows, through the practice referred to herein as a reverse color conversion, the preparation of the earlier-mentioned final color palette (Block 18) which relates the color image display device's operating color space (sRGB) to each of the possible output colors (CMYK) that are producible by the color output printer.

This description, thus given with respect to what is shown in FIGS. 1 and 2, fully describes the preferred practice of the present invention, with an end result of that practice being the presence of a uniquely created final color palette which ultimately becomes, used in accordance with further practice of the invention, to effect color error diffusion in the processing of color image data flowing from the display device's sRGB operating color space to the printing output device's CMYK operating space.

Directing attention finally to FIG. 3, here there is shown generally at 20 a color error diffusion operational diagram which is very familiar in general terms to those possessing skill in the relevant art. What differs significantly in the illustration of FIG. 3 with respect to similar block diagrams that are known to those skilled in the art is that, included in what is shown in FIG. 3 is color palette Block 22 which, in relation to practice of the present invention, contains a color palette made in accordance with the creation of the just above-described final color palette, which palette results from the unique procedure of reverse color conversion based upon a calibrated color profile prepared for a color image input device. When an operation like that shown in FIG. 3 is performed, digital input imagery arriving in the illustrative sRGB input color space results in the feeding to an output device, such as a printer, of CMYK output data that is correctly "positioned" in that output device's operating color space, with vector error diffusion, also referred to herein as color error diffusion, taking place in sRGB color space as "controlled" by the operation of color palette 22.

The features of practice of the present invention have thus been fully described. The elegance and simplicity of the present invention, now explained, should be readily apparent to those skilled in the art. The "what you see is what you get" striking color performance of color error diffusion practiced in accordance with the unique final color palette prepared in accordance with the invention is very pleasing and very satisfactory.

Accordingly, while a preferred implementation of the present invention, in its best-known mode of implementation, has thus been illustrated and described herein, and several variations suggested, other variations and modifications are recognized to be possible which will come well within the scope of the present invention.

I claim:

1. A color error diffusion method effective between a color image input device operating in one color space and a color image output device operating in another color space, said method comprising
preparing a final color palette for use in a final vector error diffusion activity and intermediate color image input and output devices, and
basing that preparing upon a reverse color conversion step which is effectively applied to a generated calibrated color profile associated with operation of the color image input device wherein the basing involves establishing an initial color palette associated directly with the operation of the color image input device, and then, by utilizing that initial color palette in an initial vector error diffusion activity preceding the final vector error diffusion activity as conducted in the color image input device's operating color space, generating the generated calibrated color profile.

2. The method of claim 1, wherein the color image input device's color space is one selected from the group including sRGB color space, RGB color space and cRGB color space, and the color image output device's color space is one selected from the group including CMYK color space and CMY color space.

3. The method of claim 1 further including applying both the initial color palette used in the initial vector error diffusion activity and the final color palette used in the final vector error diffusion activity at the same circuit location when sequentially performing each activity.

4. The method of claim 3 which further includes, intermediate the steps of generating the mentioned generated calibrated color profile, and the ultimate preparing of the final color palette, implementing a step involving producing, from the mentioned generated and calibrated color profile, a color look-up table in relation to which the mentioned reverse color conversion is effectively applied to the generated calibrated color profile.

5. The method of claim 4, wherein the color image input device's color space is one selected from the group including sRGB color space, RGB color space and cRGB color space, and the color image output device's color space is one selected from the group including CMYK color space and CMY color space.

6. The method of claim 3, wherein the color image input device's color space is one selected from the group including sRGB color space, RGB color space and cRGB color space, and the color image output device's color space is one selected from the group including CMYK color space and CMY color space.

7. The method of claim 6, wherein the color image input device's operating color space is sRGB, and said establishing of the initial color palette involves identifying, with respect to the color image input device, a relationship between its operational sRGB color space and a generic CMYK color space, and the mentioned conducting of vector error diffusion activity is performed in the color image input device's sRGB color space.

8. The method of claim 7, wherein the color image input device's color space is one selected from the group including sRGB color space, RGB color space and cRGB color space, and the generic color space is one selected from the group including CMY color space and CMYK color space.

9. A color error diffusion method effective between a color image input device operating in one color space and a color image output device operating in another color space, said method comprising with respect to the color image input device, performing a first color conversion from that device's operating color space to a selected transitional color space which is a generic version of the color image output device's operating color space, creating an initial color palette from this first color conversion, using the created initial color palette in an initial vector error diffusion process, preparing test color calibration images, and from these images generating a calibrated color profile which is associated with the operation of the color image input device, from the generated calibrated color profile, producing a color look-up table which relates the color image input device's operating color space to the color image output device's operating color space, and from the produced look-up table, and employing, effectively, the performance of a second, reverse color conversion step, preparing a final color palette which relates the color image input device's operating color space to each of the possible output colors that are producible by the color image output device in its operating color space, and applying the final color palette intermediate the color image input and output devices including in a final vector error diffusion process performed subsequent to the initial vector error diffusion process.

10. The method of claim 9, wherein the color image input device's operating color space is one selected from the group including sRGB color space, RGB color space and cRGB color space, the transitional color space is one selected from the group including CMY color space and CMYK color space, and the color image output device's operating color space is one selected from the group including CMY color space and CMYK color space.

* * * * *